SPRING LOADED PINCH ROLLERS FOR MAGNETIC TAPE CARTRIDGES

Filed Feb. 15, 1968

INVENTORS
ROBERT D. CARRELL
DARRELL W. ZIELKE

BY Gullen, Sloman, & Cantor
ATTORNEYS

United States Patent Office 3,490,670
Patented Jan. 20, 1970

3,490,670

SPRING LOADED PINCH ROLLERS FOR MAGNETIC TAPE CARTRIDGES

Robert D. Carrell, Bloomfield Hills, and Darrell W. Zielke, Madison Heights, Mich., assignors, by mesne assignments, to Troy National Bank, Troy, Mich.

Filed Feb. 15, 1968, Ser. No. 705,714
Int. Cl. G11b *15/29;* B65h *17/20*
U.S. Cl. 226—187 6 Claims

ABSTRACT OF THE DISCLOSURE

A pinch roller engagement spring comprises two identical halves, each half including a spring loop, half of the spindle for the roller, and half of the fixed base. The spindle and base are on opposite ends of the resilient loop, thus permitting the spindle to deflect relative to the fixed base.

DETAILED DESCRIPTION OF THE INVENTION

Figure 1:
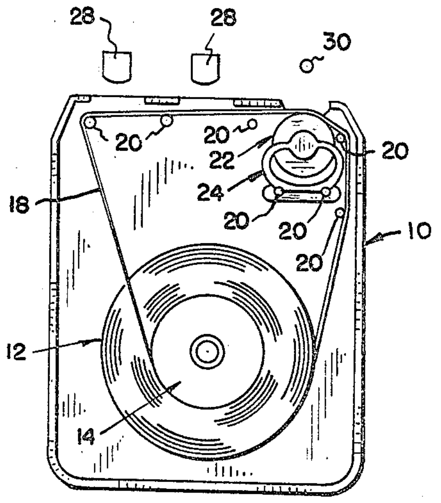
FIG. 1 is a plan view of a single reel type magnetic tape cartridge, with the cover removed to expose the inside, and greatly simplified for purposes of illustration.
Figure 2:
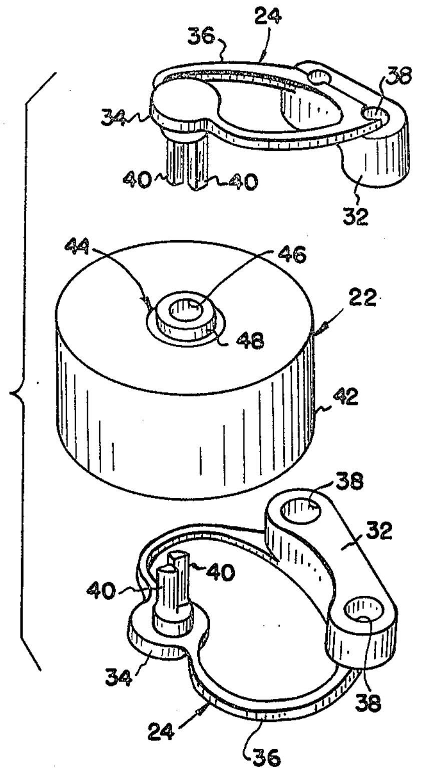
FIG. 2 is an exploded view of the pinch roller and pinch roller engagement spring assembly.
Figure 4:
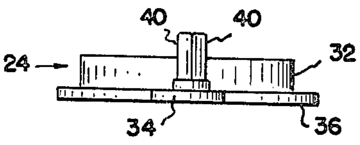
FIG. 4 is an end view of the spring of FIG. 3.
Figure 3:
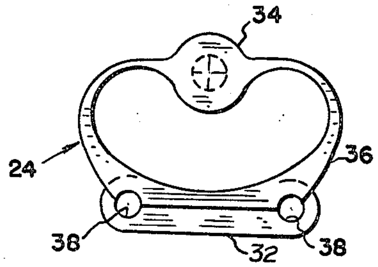
FIG. 3 is a plan view of the pinch roller engagement spring of this invention.
Figure 5:
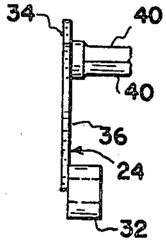
FIG. 5 is a side view of the spring of FIG. 3.

Referring first to FIG. 1 of the drawings, there is illustrated a cartridge base 10 in which magnetic tape coil 12 is spirally wound on a reel 14 rotatably mounted upon fixed spindle 16. The endless loop of tape 18 is, in the conventional manner, unwound from coil 12 at its inner diameter and guided around a series of guideposts 20 and pinch roller 22, from which it returns to and is rewound on the outer diameter of coil 12.

In the present invention, the pinch roller 22 is rotatably supported upon pinch roller engagement spring 24, the spring in turn being mounted on a pair of spring mounting posts 26 formed integrally with the cartridge base 10.

In FIG. 1, the cartridge is illustrated slightly displaced from its position of engagement in a playback device. A pair of transducer heads 28 forming part of the playback device would, upon final engagement with the cartridge enter a pair of slots in the front of the cartridge and engage tape 18 between the front sets of guideposts 20. The playback device also includes a driving capstan 30 which cooperates with pinch roller 22 to frictionally grip the tape and thereby pull it past transducer heads 28. Upon complete engagement between the cartridge and the playback device, capstan 30 would engage and displace rearwardly (downward in FIG. 1) pinch roller 22, thus compressing spring 24 and creating the desired frictional gripping force against the tape.

Referring now to FIGS. 2 through 5, it will be seen that pinch roller engagement spring 24 actually consist of two identical halves, each generally comprising a base portion 32, a spindle portion 34 and a loop portion 36.

The base 32 of each spring half is provided with a pair of vertical holes 38 which receive the spring mounting posts 26 of cartridge base 10.

The spindle upon which pinch roller 22 is rotatably mounted is constructed of two diametrically opposite spindle quadrants 40. These quadrants are separate from each other and thus have the ability to flex somewhat during assembly. Because of their diametrically opposite positioning, it will be appreciated that when the identical spring halves 24 are inverted for assembly, the two quadrants of one half will fit into the unoccupied quadrants of the other half to thereby provide a complete spindle.

Pinch roller 22 comprises a tire 42, which may be fabricated of a material such as neoprene, and a hard plastic insert 44 over which the tire is preferably molded. Insert 44 has a central bore 46 for receiving spindle quadrants 40. A small shoulder 48 is provided at each end of the insert to space slightly the upper and lower faces of tire 42 from the corresponding inner opposed faces of the spring loops 36 so as to eliminate friction therebetween.

The present spring configuration offers several advantages over previous methods of resiliently mounting the pinch roller. The acetal type plastic of which the engagement spring halves 24 are fabricated has a low co-efficient of friction, which permits it to flex readily though in face to face contact with the cartridge base and cover inner surfaces. Such face to face contact with the cartridge provides the desired vertical stability for the pinch roller.

Another advantage of the configuration of this invention is that the geometry of the resilient loop 36 provides a very high spring rate in the lateral direction to resist deflection along the left-right axis as viewed in FIG. 1, while permitting deflection in the longitudinal or up-down direction. The spring rates in these two mutually perpendicular directions can be readily varied as desired by modifying the thickness of the loop as view in FIG. 3. It is the relatively thick section at the point where loop 36 joins base 32 that gives this lateral stiffness.

Many prior art pinch roller springs were in the form of a cantilevered arm with a torsional spring, the pinch roller being rotatably mounted at the end of the arm. The disadvantage of this prior art configuration was that, with the arm pivot point located off to one side of the pinch roller, the pinch roller axis swung on an arc as it deflected toward or away from the capstan. This arcuate movement introduced a lateral deflection as well as the desired longitudinal deflection, thus undesirably changing the relationship and point of tangency between the pinch roller and the capstan. The configuration of the spring of this invention, however, provides a substantially pure longitudinal deflection with no lateral component.

Still another advantage of the present engagement spring is that the great stability provided by the upper and lower halves tends to prevent any torsional loading of the pinch roller axis which would otherwise tend to tilt the pinch roller with respect to the axis of the capstan. It will be appreciated that any time that the axes of the pinch roller and capstan are non-parallel, the tape will tend to skew up or down with respect to the cooperating surfaces of the capstan and pinch roller, with the resulting likelihood that the tape will become tangled or snarled in the cartridge.

All the above advantages of the spring of this invention combine to assure that constant pinch roller pressure against the capstan will be achieved. This is essential, since excess pressure can stop or slow the tape, as well as cause the drive to draw more current and shorten battery life. Insufficient engagement pressure causes the tape to slip.

We now claim:

1. In a tape driving system for use in conjunction with a magnetic tape cartridge containing a single reel of spirally wound endless loop tape wherein a loop of tape is continuously unwound from the freely mounted reel and driven past a recording playback transducer by the driving system and rewound onto the same reel, and wherein the tape driving system is characterized by a power driven capstan mounted in the cartridge-receiving playback apparatus and so positioned as to press a portion of the free tape loop against a cylindrical pinch roller rotatably mounted in the cartridge, the tape being thus frictionally gripped between the capstan and the pinch roller and driven at the peripheral speed of the powered capstan, the improved pinch roller mounting spring which comprises:

a base portion at one end of said spring and having mounting means to securely and immovably connect said spring base to said cartridge;

a spindle portion for rotatably-receiving the pinch roller;

and a resilient loop portion interconnecting said base and said spindle, said loop lying in a plane perpendicular to the axis of said spindle and functioning to bias said spindle portion toward the playback capstan.

2. The pinch roller mounting spring of claim 1 wherein said loop is generally D-shaped, with the straight portion of the D forming said base portion of the spring and being rigid and non-resilient;

said spindle portion being located at the midpoint of the resilient curved portion of the D;

said spring being symmetrical about a line drawn perpendicularly from the midpoint of the base portion to the spindle axis, this axis of symmetry corresponding to the path of biased movement of said spindle;

the spring rate of said spring along the two directions mutually perpendicular to said axis of symmetry being substantially greater than the spring rate along said axis so as to substantially eliminate any motion of said spindle along either of such two directions

3. The pinch roller mounting spring of claim 1 which comprises two identical loop portions each connected to its respective base portion, said loops lying on opposite ends of the pinch roller and connected to the opposite ends of said spindle portion.

4. The pinch roller mounting spring of claim 2 which comprises two identical loop portions each connected to its respective base portion, said loops lying on opposite ends of the pinch roller and connected to the opposite ends of said spindle portion.

5. The pinch roller mounting spring of claim 4 which comprises two identical halves, each half comprising half of said base portion and half of said spindle portion formed integrally with a complete loop portion, one spring half adapted to be positioned above the pinch roller and the other spring half adapted to be positioned below the pinch roller.

6. The pinch roller mounting spring of claim 5 wherein said spindle portion of each half of said spring comprises two diagonally opposite 90° quadrants running substantially the full axial length of said spindle, whereby the two spring halves can be inverted relative to each other and assembled together with their spindle portions interlocking.

References Cited

UNITED STATES PATENTS

| | | | |
|---|---|---|---|
| 2,998,905 | 9/1961 | Bieber | 226—194 X |
| 3,243,134 | 3/1966 | Reed et al. | 266—187 X |
| 3,269,626 | 8/1966 | Albrecht | 226—194 X |

ALLEN N. KNOWLES, Primary Examiner

U.S. Cl. X.R.

226—194